(12) United States Patent
Kurashige

(10) Patent No.: US 8,762,628 B2
(45) Date of Patent: Jun. 24, 2014

(54) INFORMATION PROCESSING APPARATUS AND CACHE METHOD

(75) Inventor: Takehiko Kurashige, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 108 days.

(21) Appl. No.: 13/418,006

(22) Filed: Mar. 12, 2012

(65) Prior Publication Data

US 2013/0036260 A1 Feb. 7, 2013

(30) Foreign Application Priority Data

Aug. 5, 2011 (JP) ................................ 2011-171745

(51) Int. Cl.
*G06F 12/00* (2006.01)
(52) U.S. Cl.
USPC .......................................................... 711/103
(58) Field of Classification Search
None
See application file for complete search history.

(56) References Cited

U.S. PATENT DOCUMENTS

| | | | |
|---|---|---|---|
| 5,253,351 A * | 10/1993 | Yamamoto et al. | 711/118 |
| 5,870,595 A | 2/1999 | Oki | |
| 7,320,055 B2 | 1/2008 | Ito et al. | |
| 7,962,692 B2 * | 6/2011 | Puishys, Jr. et al. | 711/118 |
| 8,032,698 B2 * | 10/2011 | Nam | 711/113 |
| 2005/0108473 A1 | 5/2005 | Le Moal et al. | |
| 2007/0011361 A1 | 1/2007 | Okada et al. | |
| 2008/0276040 A1 * | 11/2008 | Moritoki | 711/113 |
| 2012/0017034 A1 * | 1/2012 | Maheshwari et al. | 711/103 |
| 2013/0103906 A1 * | 4/2013 | Bannon et al. | 711/135 |

FOREIGN PATENT DOCUMENTS

| | | |
|---|---|---|
| JP | 62-198946 | 9/1987 |
| JP | 64-039853 | 2/1989 |
| JP | 10-240371 | 9/1998 |
| JP | 2834298 | 10/1998 |
| JP | 3083530 | 6/2000 |
| JP | 2001-217996 | 8/2001 |
| JP | 2005-148961 | 6/2005 |
| JP | 2005-166073 | 6/2005 |
| JP | 2006-163474 | 6/2006 |
| JP | 2007-018236 | 1/2007 |
| JP | 2008-234320 | 10/2008 |

OTHER PUBLICATIONS

Japanese Patent Application No. 2011-171745, Final Office Action, mailed Sep. 4, 2012, (with English Translation).
Japanese Patent Application No. 2011-171745, First Office Action, mailed Jun. 5, 2012, (with English Translation).

* cited by examiner

*Primary Examiner* — Brian Peugh
(74) *Attorney, Agent, or Firm* — Blakely, Sokoloff, Taylor & Zafman LLP

(57) ABSTRACT

According to one embodiment, an information processing apparatus includes a controller and a cache module. The controller is configured to issue commands for a first storage device and a second storage device, and thereby perform data transmission. The cache module is configured to use the first storage device as a read cache of the second storage device, the cache module withholding issuance of a write command to write cache data in the first storage device to the controller, when commands issued by the controller to the first storage device exceed a preset number, until the issued commands becomes equal to or less than the preset number.

16 Claims, 7 Drawing Sheets

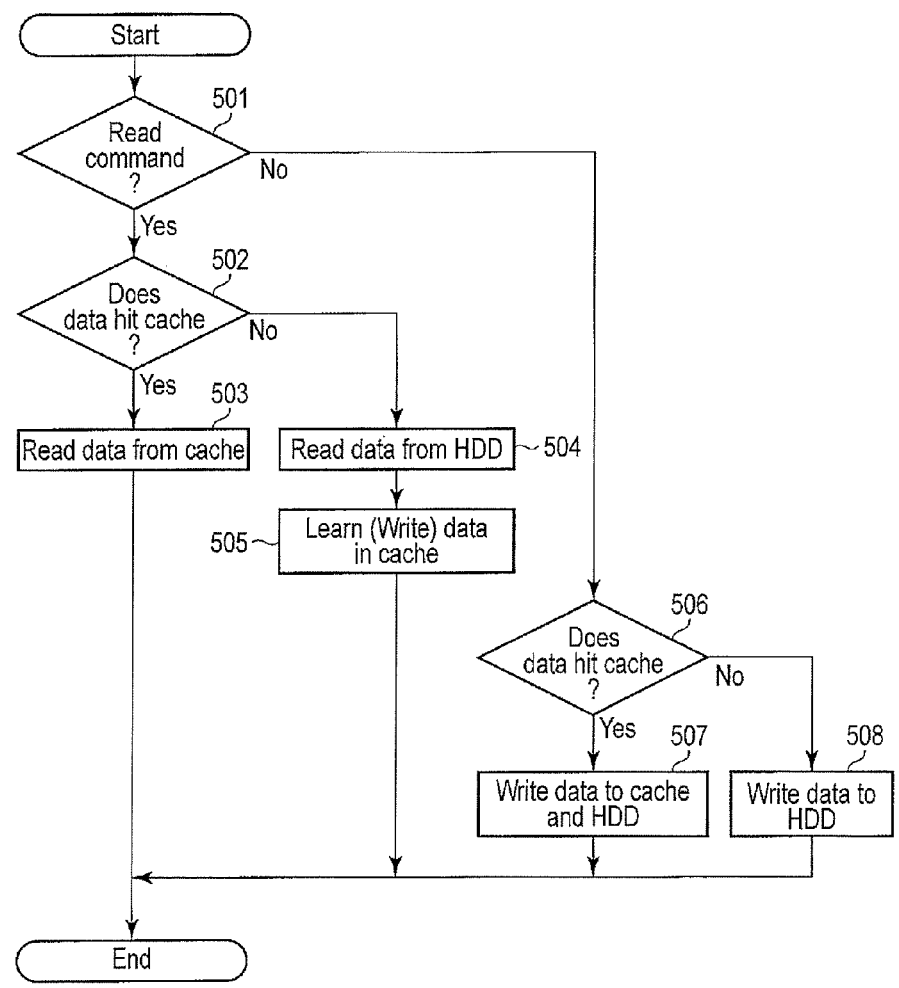
F I G. 4

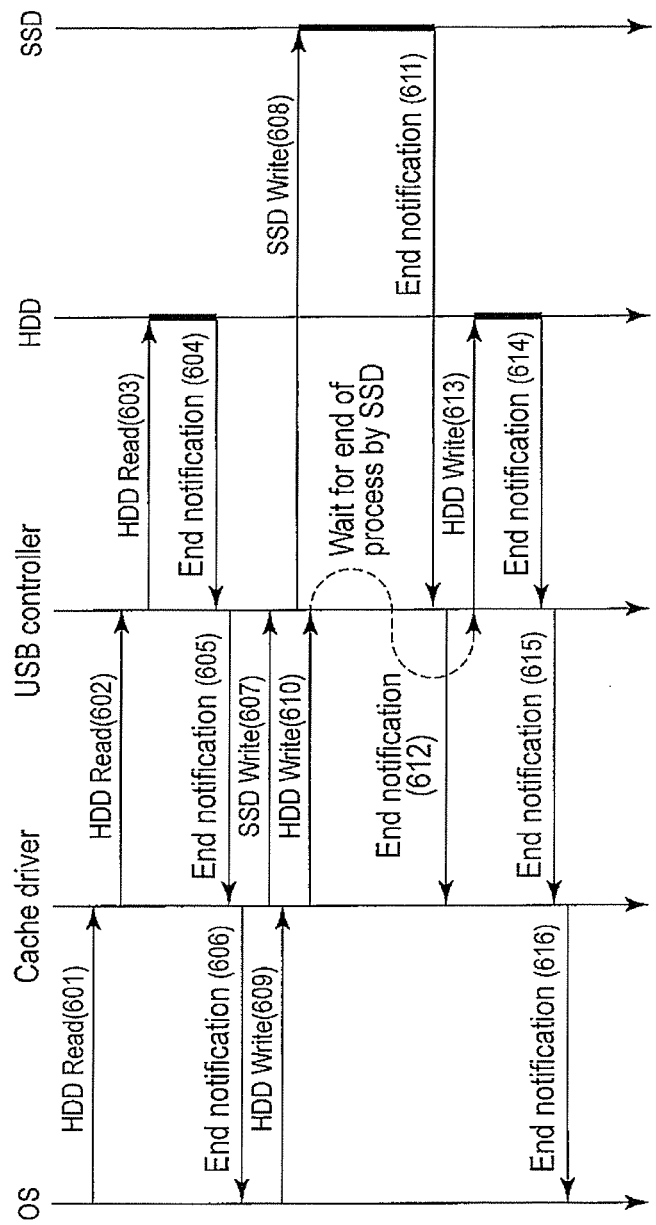
F I G. 5

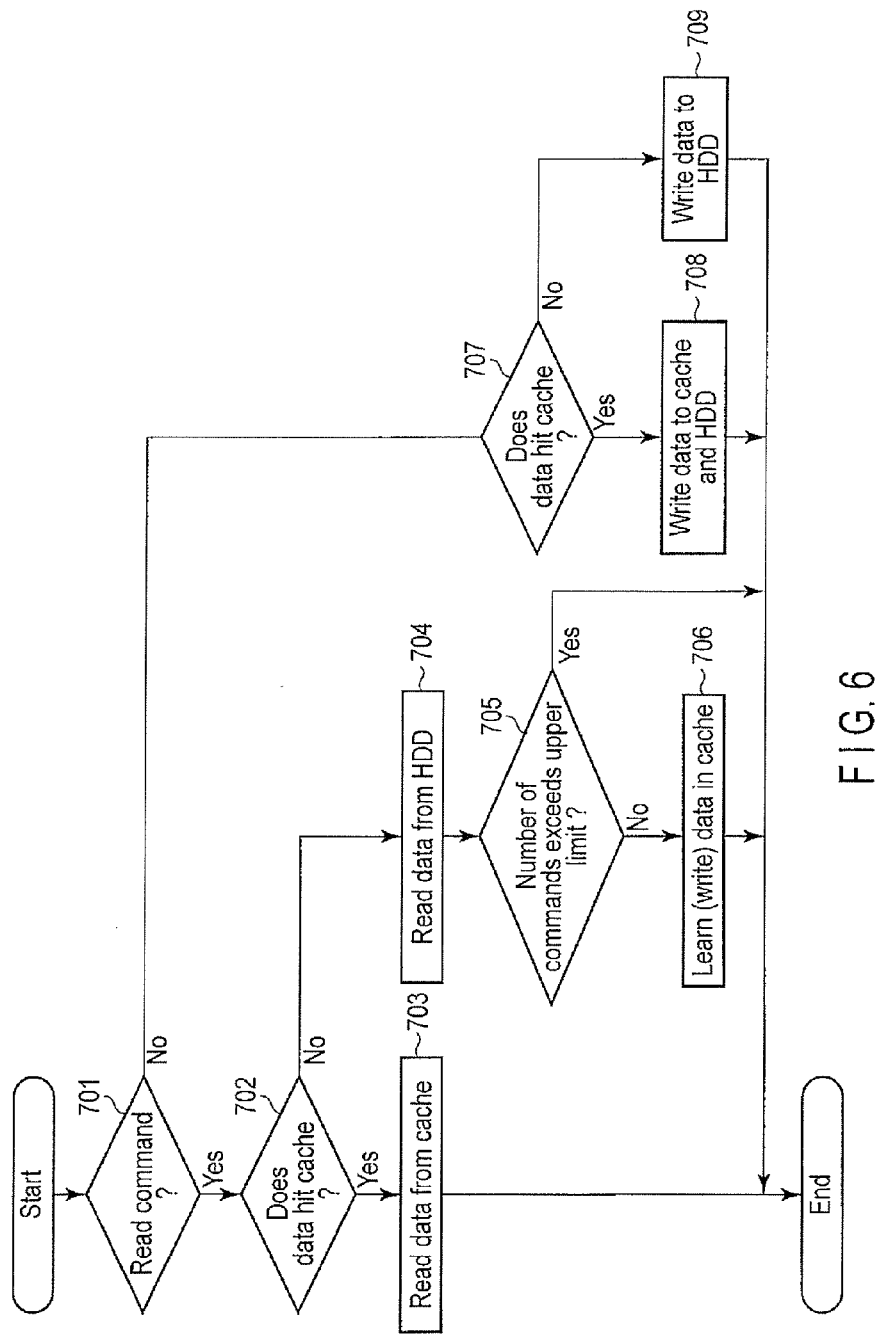
F I G. 6

INFORMATION PROCESSING APPARATUS AND CACHE METHOD

CROSS-REFERENCE TO RELATED APPLICATIONS

This application is based upon and claims the benefit of priority from prior Japanese Patent Application No. 2011-171745, filed Aug. 5, 2011, the entire contents of which are incorporated herein by reference.

FIELD

Embodiments described herein relate generally to an information processing apparatus and a cache method, in which a first storage device and a second storage device are connected to one controller, and the first storage device is used as a cache of the second storage device.

BACKGROUND

Chipsets which include a Serial ATA (SATA) controller that uses a solid-state drive (SSD) as a cache of a hard disk drive have been commercialized.

It has been proposed to use an SSD (USB-SSD) which is connected to a USB controller as a read cache of a hard disk drive (USB-HDD) that is connected to the USB controller.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is an exemplary flowchart illustrating a process of operation of an ordinary read cache.

FIG. 5 is an exemplary diagram for explaining that performance deteriorates when an SSD which is connected to an USB controller is used as a read cache of an HDD that is connected to the USB controller.

FIG. 6 is an exemplary flowchart illustrating a process of cache processing performed by a cache driver of the embodiment.

DETAILED DESCRIPTION

Various embodiments will be described hereinafter with reference to the accompanying drawings.

In general, according to one embodiment, an information processing apparatus comprises a controller and a cache module. The controller is configured to issue commands for a first storage device and a second storage device, and thereby perform data transmission. The cache module is configured to use the first storage device as a read cache of the second storage device, the cache module withholding issuance of a write command to write cache data in the first storage device to the controller, when commands issued by the controller to the first storage device exceed a preset number, until the issued commands becomes equal to or less than the preset number.

Figure 1:
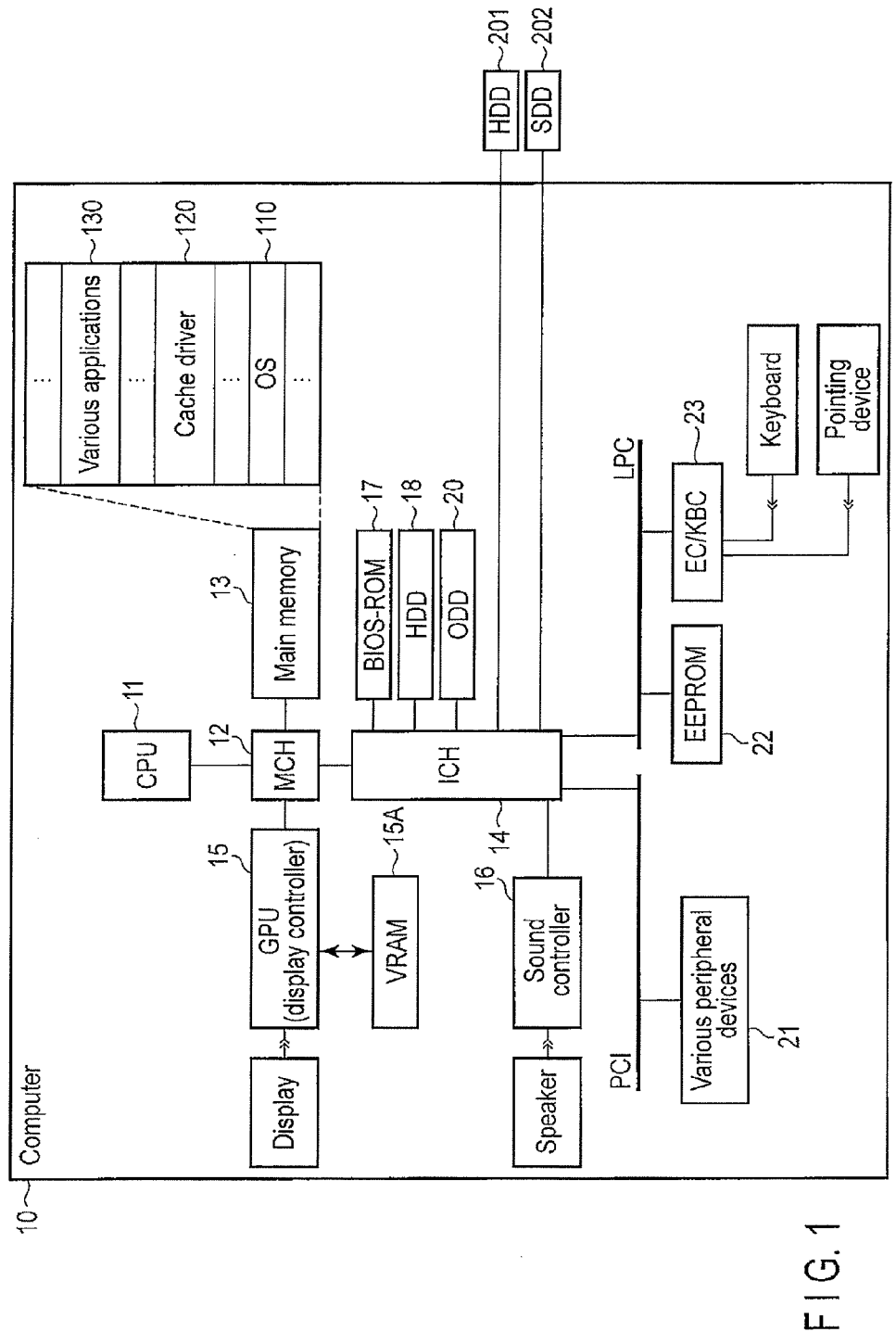
FIG. 1 is an exemplary block diagram of a configuration of an information processing apparatus according to an embodiment.

FIG. 1 is a diagram illustrating a system configuration of an information processing apparatus according to an embodiment. The information processing apparatus of the present embodiment is realized as a personal computer.

As illustrated in FIG. 1, the information processing apparatus comprises a central processing unit (CPU) 11, a memory controller hub (MCH) 12, a main memory (volatile memory) 13, an input/output controller hub (ICH) 14, a graphics processing unit (GPU) 15, a video memory (VRAM) 15A, a sound controller 16, a Basic Input/Output System read-only memory (BIOS-ROM) 17, a hard disk drive (HDD) 18, an optical disc drive (ODD) 20, various peripheral devices 21, an electrically erasable programmable ROM (EEPROM) 22, and an embedded controller/keyboard controller (EC/KBC) 23.

The CPU 11 is a processor which controls operation of the information processing apparatus, and executes various programs that are loaded from the HDD 18 and the ODD 20 into the main memory 13. The various programs that are executed by the CPU 11 include an OS 110 which manages resource control, and a cache driver 120 and various application programs 130 which operate under the OS 110. The cache driver 120 is a program which uses an SSD 202 described later as a cache device.

The CPU 11 also executes a BIOS which is stored in the BIOS-ROM 17. The BIOS is a program for hardware control. In the following explanation, the BIOS itself which is stored in the BIOS-ROM 17 is sometimes also referred to as the BIOS-ROM 17.

The MCH 12 operates as a bridge which connects the CPU 11 with the ICH 14, and as a memory controller which controls access to the main memory 13. The MCH 12 also has a function of performing communication with the GPU 15.

The GPU 15 is a display controller which controls a display device that is incorporated in, or externally connected to the information processing apparatus. The GPU 15 includes a VRAM 15A, and is equipped with an accelerator which draws, instead of the CPU 11, an image to be displayed by the various programs.

The ICH 14 includes an Advanced Technology Attachment (ATA) controller configured to control the HDD 18 and the ODD 20. The ICH 14 also controls the various peripheral devices 21 which are connected to a Peripheral Component Interconnect (PCI) bus. The ICH 14 also has a function of communicating with the sound controller 16.

The sound controller 16 is a sound source device. The sound controller 16 outputs audio data to be played back by the various programs to speakers which are incorporated in, or externally connected to, the information processing apparatus.

The EEPROM 22 is a memory device configured to store, for example, individual data and configuration data of the information processing apparatus. The EC/KBC 23 is a one-chip micro processing unit (MPU), into which an embedded controller configured to perform electric power control and a keyboard controller configured to control data inputs performed by operation of a keyboard or a pointing device are integrated.

The cache driver 120 uses at least part (non-volatile cache [NVC]) of a region of the SSD 202 as a cache memory of the HDD 201.

Figure 2:
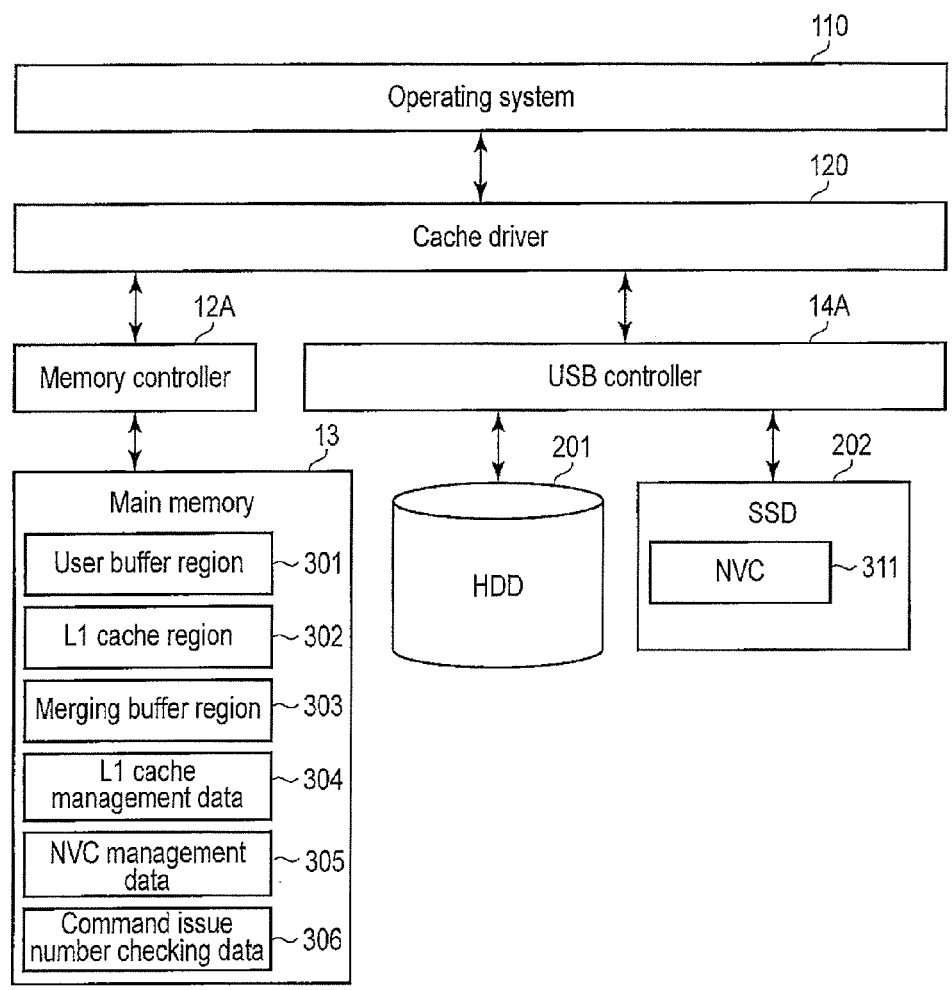
FIG. 2 is an exemplary block diagram of a main part of the information processing apparatus according to the embodiment.

Next, a function of the cache driver 120 will be explained hereinafter with reference to FIG. 2. FIG. 2 is a block diagram of a main part of the information processing apparatus illustrated in FIG. 1.

A user buffer region 301, an L1 cache region 302, and a merging buffer region 303 are secured in the main memory 13. In addition, L1 management data 304, NVC management data 305, and command issue number checking data 306 are prepared in the memory 13 by the cache driver 120.

The L1 cache region 302 is a buffer which is used when data is copied in the NVC 311. The L1 cache region 302 is secured in the main memory 13 when a filter driver is loaded. The L1 cache region 302 has a capacity of about 16 MB.

The merging buffer region 303 is used when the cache method is the write-back method. The merging buffer region 303 is used for temporarily storing data which is read from the HDD 201 and not stored in the L1 cache region 302, when part of data is stored in the L1 cache region in read access. The merging buffer region 303 has a capacity which is the same as the L1 cache region 302. The L1 management data 304 is data for managing cache data which is stored in the L1 cache region 302. The NVC management data 305 is data for managing cache data which is stored in the NVC 311. A plurality of entries are set in the NVC management data 305, and each entry stores a storing place of the cache data, a storing place in the HDD 201 which corresponds to the cache data, and data which indicates whether the cache data agrees with data in the HDD 201. A value of the command issue number checking data 306 is provided to check the number of commands which are being issued to the SSD 202. The value of the command issue number checking data 306 is increased when a command (write command, read command) is issued to the SSD 202, and the value of the command issue number checking data 306 is decreased when a notification that the issued command is finished is returned.

The information processing apparatus 10 is controlled by the operating system (OS) 110, and all the accesses from the operating system 110 to the HDD 201 are performed through the cache driver 120. The cache driver 120 directly or indirectly controls the USB controller 14A. An HDD 201 is connected through the USB controller 14A. In addition, the cache driver 120 performs access to data of the main memory 13 through the memory controller 12A.

The cache driver 120 is loaded into the main memory 13 when the system is started. The cache driver 120 secures and initializes a region for storing the cache management data 304 in the main memory 13, to change the region to a state in which no data is recorded in the cache, and thereafter starts cache control processing. The cache management data 304 includes data for managing cache data such as a cache directory. When the cache driver 120 is operated, the cache driver 120 records data for managing learning data of a write cache and a read cache in the cache management data 304 in the main memory 13. When the system is shut down, the cache driver 120 erases the cache management data 304 in the main memory 13.

Before the cache driver 120 starts operation, the BIOS program controls access to the HDD 201. The USB controller 14A accesses the HDD 201, when there is a write access request or a read access request from the host.

Part or all of regions of the SSD 202 is used as cache of the HDD 201. The operating system 110 cannot directly access the cache of the SSD 202, which is used as a storage region for the cache data.

The information processing apparatus is aimed at increase in speed of access to the HDD 201, by using the solid-state drive (SSD) 202, which has an access speed higher than that of the HDD 201, as the cache of the HDD 201. The SSD 202 includes a flash memory (non-volatile memory).

Figure 3:
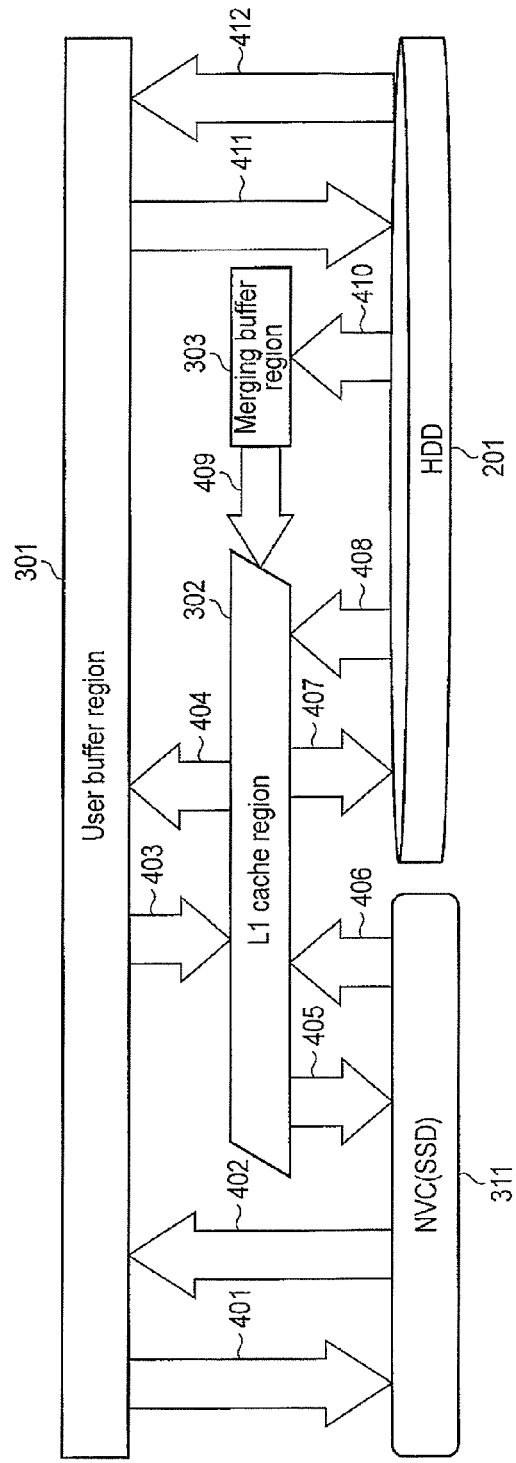
FIG. 3 is an exemplary diagram for explaining an outline of operation performed when an NVC of FIG. 2 is used as a cache.

Next, an outline of operation performed when the NVC 311 is used as cache will be explained hereinafter with reference to FIG. 3.

When read access data does not hit the cache data in the L1 cache and the NVC 311, the cache driver 120 reads data from the HDD 201, and writes the read data in the L1 cache region 302 (Block S408). Then, the cache driver 120 writes the data which is written in the L1 cache region 302 in the user buffer region 301 (Block 404). When access to the L1 cache region 302 is busy, the cache driver 120 reads data from the HDD 201, and writes the read data in the user buffer region 301 (Block 412).

When all the read access data items hit the cache data in the L1 cache region 302, the cache driver 120 reads data from the L1 cache region 302, and writes the data in the user buffer region 301 (Block 404).

When part of write access data hits the cache data in the L1 cache region 302, the cache driver 120 reads data which did not hit the cache data from the HDD 201, and writes the read data in the merging buffer region 303 (Block 410). Then, the cache driver 120 merges the hit data in the L1 cache region 302 and the data written in the merging buffer region 303, in the L1 cache region 302 (Block 409). The cache driver 120 stores the merged data in the user buffer region 301 (Block 404). The cache driver 120 also stores the merged data in the NVC 311 (Block 405).

When the read access data misses the cache data in the L1 cache region 302 and all the read access data items hits the cache data in the NVC 311, the cache driver 120 reads data from the NVC 311, and writes the data in the user buffer region 301 (Block 402).

When the read access data misses the cache data in the L1 cache region 302 and part of the read access data hits the cache data in the NVC 311, the cache driver 120 reads data which did not hit the cache data from the HDD 201, and writes the read data in the merging buffer region 303 (Block 410). Then, the cache driver 120 reads the hit data from the NVC 311 (Block 406). The cache driver 120 merges the data which is read from the NVC 311 and the data in the merging buffer region 303, in the L1 cache region 302 (Block 409). The cache driver 120 transmits the merged data to the user buffer region 301 (Block 404). The cache driver 120 also stores the merged data in the NVC 311 (Block 405).

When the write access data does not hit the cache data in the L1 cache region 302 and the NVC 311, the cache driver 120 temporarily writes the write access data in the L1 cache region 302 (Block 403), and thereafter writes the write access data written in the L1 cache region 302 in the NVC 311 (Block 405). When access to the L1 cache region 302 is busy, the cache driver 120 directly writes the write access data in the HDD 201.

When the write access data hits the cache data in the L1 cache region 302, the cache driver 120 writes the write access data in the L1 cache region 302 (Block 403), and then stores the write access data written in the L1 cache region 302 in the NVC 311 (Block 405).

When the write access data hits the cache data in the NVC 311, the cache driver 120 writes the write access data in the NVC 311 (Block 401).

When the cache data which is written in the L1 cache region 302 is not written in the HDD 201, the cache driver 120 writes the data written in the L1 cache region 302 in the HDD 201 (Block 407).

When the cache data written in the NVC 311 is not written in the hard disk drive, the cache driver 120 reads the data from the NVC 311, and writes the read data in the L1 cache region 302 (Block 406). The cache driver 120 writes the data written in the L1 cache region 302 in the HDD 201 (Block 407).

The cache driver 120 performs data transmission by a combination of basic data transmission functions of Block 401 to Block 412.

(Write-Through Cache)

A read cache is also referred to as a write-through cache. Operation of an ordinary read cache will be explained hereinafter with reference to FIG. 4.

When a command to access from the operating system 110 to the HDD 201 is issued, the cache driver 120 determines whether the command is a read command or not (Block 501). When it is determined that the command is a read command (Yes in Block 501), the cache driver refers to the NVC management data 305, and thereby determines whether any data which corresponds to the read command exists in the NVC 311 (Block 502). When it is determined that the data exists in the NVC 311 (Yes in Block 502), the cache driver reads the data which corresponds to the read command from the NVC 311 (Block 503). When it is determined that no data corresponding to the read command exists in the NVC 311, the cache driver reads data which corresponds to the read command from the HDD 201 (Block 504). Then, the cache driver writes the data which is read from the HDD 201 in the NVC 311, and learns the data (Block 505).

When it is determined at Block 501 that the command is not a read command (that is, the command is a write command) (No in Block 501), the cache driver 120 determines whether any data of an address which corresponds to the write command exists in the NVC 311 (Block 506). When it is determined that the data exists in the NVC 311 (Yes in Block 506), the cache driver 120 renews the data which exists in the NVC 311, and writes the data which corresponds to the write command in the HDD 201 (Block 507). When it is determined that no data corresponding to the write command exists in the NVC 311 (No in Block 506), the cache driver writes the data which corresponds to the write command in the HDD 201 (Block 508).

The cache driver performs the above operation in the case of learning a read access after a sequential read is detected.

The actual cache control is not a straight-line flow as explained with reference to FIG. 4. Generally, control is temporarily returned when a command is issued to the storage device, and the rest of the processing is performed when the command for the storage device is finished. Commands for the cache device (SSD) are classified into the following categories.

(A) A read command hits the cache, and data is reads from the cache (B) A write command hits the cache, and data is written in the cache (C) A read command misses the cache, and data which is read from the HDD is written in the cache to learn the data Commands in categories A and B are commands which are issued in response to commands from the host. Since the host cannot continue to execute the task until these commands are finished, the commands should be processed with the highest priority. In comparison with this, with respect to category C, since an end notification is returned to the host for a read command from the host at the time when the data is read from the HDD, and the host continues to execute the task. Specifically, commands in category C are processed with lower priority. When a command for the cache device is issued to a subordinate module (a subordinate driver or device), a command in category A or B is generally issued with higher priority, and a command in category C is issued with lower priority.

However, when a subordinate module such as a USB module does not support priority control, all the commands are processed with equal priority. Generally, the host simultaneously performs several processes, and a number of commands are issued to the storage device. When a number of read commands miss the cache, and a category A or B command is issued during issuance of a number of category C commands, the category A or B command is not executed until execution of the unprocessed category C commands is finished, and the processing performance of the system decreases.

In the present embodiment, when two or more commands are issued to the SSD 202, the cache driver 120 does not issue a write command to write cache data in the NVC 311 to the USB controller 14A, and thereby suppresses decrease in the processing performance of the system.

An example of decrease in the processing performance will be explained hereinafter with reference to FIG. 5.

The operating system 110 issues a read command for the HDD 201 to the cache driver (Block 601). The cache driver issues a read command for the HDD 201 to the USB controller 14A (Block 602). The USB controller 14A issues a read command to the HDD 201 (Block 603). When transmission of data is finished, the HDD 201 issues an end notification to the USB controller 14A (Block 604). The USB controller 14A issues an end notification to the cache driver (Block 605). The cache driver issues an end notification to the OS 110 (Block 606). The cache driver issues a write command to write the read data as cache data in the SSD 202 to the USB controller 14A, to learn the read data (Block 607). The operating system 110 issues a write command to write data in the HDD 201 to the cache driver (Block 609). The USB controller 14A issues a write command to write the data read from the HDD 201 as cache data in the SSD 202 to the SSD 202 (Block 608).

The cache driver issues a write command for the HDD 201 to the USB controller 14A (Block 610). Since the write command of Block 608 is being issued, the USB controller 14A cannot issue a write command to the HDD 201.

When writing in response to the write command of Block 608 is finished, the SSD 202 issues an end notification to the USB controller 14A (Block 611). The USB controller 14A issues an end notification to the cache driver (Block 612). Since the number of commands which is being issued by the USB controller 14A becomes zero, the USB controller 14A issues a write command which corresponds to the write command of Block 610 to the HDD 201 (Block 613). When writing of data which is performed in response to the write command is finished, the HDD 201 issues an end notification to the USB controller 14A (Block 614). The USB controller 14A issues an end notification to the cache driver (Block 615). The cache driver issues an end notification to the operating system 110.

Even when the USB controller 14A receives the write command of Block 610 to write data in the HDD 201, the USB controller 14A cannot issue a write command which corresponds to the write command of Block 610 to the HDD 201, since the write command of Block 608 is being issued. Therefore, the processing performance of the system decreases.

The present embodiment provides a cache driver 120 which prevents a category A or B command from having to wait to be processed because of processing of a category C command, and suppresses decrease in the performance of the system, in the case of using a USB storage device which does not support priority control.

Next, a process performed by the cache driver 120 will be explained hereinafter with reference to a flowchart of FIG. 6.

When the operating system 110 issues an access command to access the HDD 201, the cache driver 120 determines whether the command is a read command or not (Block 701). When it is determined that the command is a read command (Yes in Block 701), the cache driver 120 refers to the NVC management data 305, and thereby determines whether any data which corresponds to the read command exists in the NVC 311 (Block 702). When it is determined that the data exists in the NVC 311 (Yes in Block 702), the cache driver 120 reads data which corresponds to the read command from the NVC 311 (Block 703). When it is determined that no data corresponding to the read command exists in the NVC 311, the cache driver 120 reads data which corresponds to the read command from the HDD 201 (Block 704).

The cache driver 120 determines whether the number of commands issued to the NVC 311 (SSD 202) exceeds a set number, by referred to the value of the command issue number checking data 306 (Block 705). When it is determined that the number of commands does not exceed the set number (No in Block 705), the cache driver 120 writes the data read from the HDD 201 in the NVC 311, and learns the data (Block 706). When it is determined that the number of commands exceeds the set number (Yes in Block 705), the cache driver 120 does not learn the data read from the HDD 201.

When it is determined at Block 701 that the command is not a read command (that is, the command is a write command) (No in Block 701), the cache driver 120 determines whether any data of an address which corresponds to the write command exists in the NVC 311 (Block 707). When it is determined that data which corresponds to the write command exists in the NVC 311 (Yes in Block 707), the cache driver 120 renews the data existing in the NVC 311, and write the data which corresponds to the write command in the HDD 201 (Block 708). When it is determined that no data corresponding to the write command exists in the NVC 311 (No in Block 707), the cache driver 120 writes data which corresponds to the write command in the HDD 201 (Block 709).

The cache driver 120 does not learn data when processing which corresponds to the command that is issued to the SSD 202 has not been finished, and thereby can suppress decrease in performance.

Since the processing using the SSD 202 of the present embodiment as cache of the HDD 201 is realized by a computer program, the same effect as the present embodiment can be easily realized only by installing the computer program in an ordinary computer through a storage medium which is readable by a computer. The computer program can be executed in not only a personal computer but also an electronic apparatus which includes a processor.

(Modification)

Figure 7:
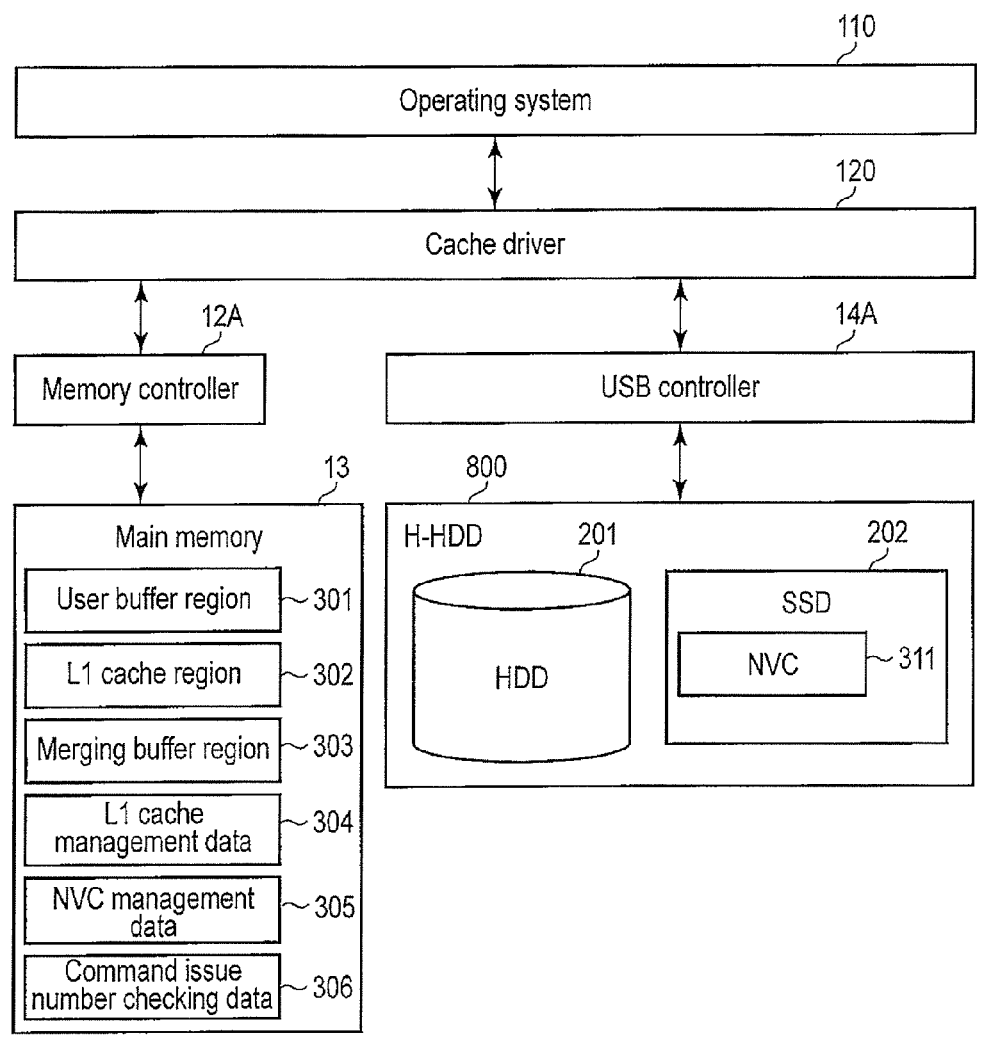
FIG. 7 is an exemplary block diagram illustrating an example of a configuration of an information processing apparatus according to a modification of the embodiment.

Although the above embodiment shows the example in which the HDD 201 is separated from the SSD 202, cache control of the above embodiment can be used for a hybrid hard disk drive 800, in which the HDD 201 and the SSD 202 are provided in a housing, as illustrated in FIG. 7.

The various modules of the systems described herein can be implemented as software applications, hardware and/or software modules, or components on one or more computers, such as servers. While the various modules are illustrated separately, they may share some or all of the same underlying logic or code.

While certain embodiments have been described these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a controller configured to issue commands for a first storage device and a second storage device, and thereby perform data transmission; and
a cache module configured to use the first storage device as a read cache of the second storage device, the cache module determining whether commands issued by the controller to the first storage device exceed a preset number or not, when a command to the second storage device is a read command and no data corresponding to the read command exists in the first storage device, and issuing a write command to write cache data in the first storage device, only when the commands do not exceed a preset number.

2. The apparatus of claim 1, wherein the controller is configured to conform to the Universal Serial Bus (USB) standard.

3. The apparatus of claim 1, wherein the first storage device comprises a flash memory.

4. The apparatus of claim 1, wherein the second storage device comprises a hard disk drive.

5. The apparatus of claim 1, wherein the first storage device is configured to process commands issued from the controller with equal priority.

6. The information processing apparatus of claim 1, wherein the cache module stores commands issued to the first storage device from the controller in a memory, and determines whether the commands stored in the memory exceed the preset number or not.

7. The information processing apparatus of claim 1, wherein the cache module increments commands stored in the memory when the commands are issued to the first storage device from the controller, and decrements commands when end notification is received from the first storage device.

8. The information processing apparatus of claim 1, wherein commands issued from the controller to the first storage device comprise both read and write commands.

9. A cache method using a first storage device which is connected to a controller as a read cache of a second storage device which is connected to the controller, the method comprising:
determining whether commands issued by the controller to the first storage device exceed a preset number or not, when a command to the second storage device is a read command and no data corresponding to the read command exists in the first storage device; and
issuing a write command to write cache data in the first storage device, only when the commands do not exceed a preset number.

10. The method of claim 9, wherein the controller is configured to conform to the Universal Serial Bus (USB) standard.

11. The method of claim 9, wherein the first storage device comprises a flash memory.

12. The method of claim 9, wherein the second storage device comprises a hard disk drive.

13. The method of claim 9, wherein the first storage device is configured to process commands issued from the controller with equal priority.

14. The method of claim 9, wherein the cache module stores commands issued to the first storage device from the controller in a memory, and determines whether the commands stored in the memory exceed the preset number or not.

15. The method of claim 9, wherein the cache module increments commands stored in the memory when the commands are issued to the first storage device from the controller, and decrements commands when end notification is received from the first storage device.

16. The method of claim 9, wherein commands issued from the controller to the first storage device comprise both read and write commands.

* * * * *